(12) United States Patent  (10) Patent No.: US 7,553,090 B2
Schempp et al. (45) Date of Patent: Jun. 30, 2009

(54) OPTICAL CONNECTOR

(75) Inventors: Otto Schempp, Bad Rappenau (DE); Mathias Gerner, Untereisesheim (DE)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/586,983

(22) PCT Filed: Jan. 21, 2005

(86) PCT No.: PCT/EP2005/000590

§ 371 (c)(1), (2), (4) Date: Apr. 26, 2007

(87) PCT Pub. No.: WO2005/071458

PCT Pub. Date: Aug. 4, 2005

(65) Prior Publication Data

US 2007/0217746 A1 Sep. 20, 2007

(30) Foreign Application Priority Data

Jan. 27, 2004 (DE) .................... 10 2004 004 240

(51) Int. Cl.
*G02B 6/36* (2006.01)
*G02B 6/43* (2006.01)

(52) U.S. Cl. .......................... 385/89; 385/92
(58) Field of Classification Search .............. None
See application file for complete search history.

(56) References Cited

U.S. PATENT DOCUMENTS

| 4,389,091 | A | * | 6/1983 | Lidholt et al. ................. 385/64 |
| 4,802,725 | A | * | 2/1989 | Borne et al. ................... 385/89 |
| 5,140,661 | A | * | 8/1992 | Kerek ............................ 385/81 |
| 5,993,071 | A | | 11/1999 | Hultermans |
| 6,186,671 | B1 | | 2/2001 | Rucks et al. |
| 6,325,548 | B1 | | 12/2001 | Shirakawa |
| 6,450,703 | B1 | | 9/2002 | Shirakawa |
| 6,558,045 | B2 | * | 5/2003 | Yamaguchi .................. 385/75 |

FOREIGN PATENT DOCUMENTS

| DE | 19742932 | 4/1998 |
| DE | 19934962 | 2/2000 |
| DE | 19841766 | 3/2000 |

(Continued)

OTHER PUBLICATIONS

International Search Report for PCT/EP2005/000590. Apr. 11, 2005.

*Primary Examiner*—Omar Rojas
(74) *Attorney, Agent, or Firm*—Timothy M. Morella

(57) ABSTRACT

The invention relates to a connector for establishing multi media connections in vehicles according to MOST®-standard.

The objective is to provide an optical connector, which is simple, quick and inexpensive to manufacture, providing an optical connection with low damping, high precision and durability.

The MOST-connector comprises at least one optical terminal with a fiber receiving sleeve, wherein the optical fiber section is located, wherein the optical fiber section is affixed directly to the fiber receiving sleeve through clamping elements. According to the invention the fiber receiving sleeve comprises a front side in the area of the front optical contact surface of the optical fiber section, wherein the clamping elements or latching notches are longitudinally spaced from the front side of the fiber receiving sleeve.

25 Claims, 11 Drawing Sheets

FOREIGN PATENT DOCUMENTS

| | | |
|---|---|---|
| DE | 19963426 | 1/2001 |
| EP | 1170609 A2 | 1/2002 |
| GB | 2239104 A | 6/1991 |
| JP | 01169416 | 7/1989 |
| WO | PCT/US85/01625 | 3/1986 |
| WO | PCT/IB01/88583 | 11/2001 |

* cited by examiner

OPTICAL CONNECTOR

FIELD OF THE INVENTION

The invention relates to an optical connector for connecting plastic fibers in general and establishing multi media connections in vehicles e.g. according to MOST®-standard in particular.

BACKGROUND OF THE INVENTION

Due to the increasing complexity of applications in the field of vehicle-related information technology, which can be designated as "multi media" today, new concepts for networking various devices are required.

For example at least car radios, mobile phones and navigation systems should be able to communicate with each other in a bidirectional manner, so e.g. the auto radio can be muted and the mobile telephone can be operated through the radio speakers, when the user wants to make a telephone call. It is, however, apparent that this is only a very simple application and there are hardly any limits to multi media networking of on board electronics in order to meet user needs.

In order to meet these complex requirements optical data transfer has become the standard for these connections in the automotive area. Therefore a new standard called MOST® has been developed. The specifications of the MOST® standard have been published, among others, as:

"MAMAC Specification" Rev 1.0, November 2002, Version 1.0-00 under
http://www.mostnet.de/downloads/
Specifications/MAMACSpecification_1V0-00.pdf and under
http://www.mostnet.de/downloads/Specifications/
MOST%20Physical%20Layer%20Specification/
010223 WgPhy Drawings.zip The underlying specifications of the MOST®-standard are hereby being referred to and the entirety of their content is incorporated to this disclosure by reference.

A compact type of optical MOST®-connectors includes electro-optical converters, which are connected to the back of the connector. These connectors include short wave guide sections, which are typically glued in.

In many respects these connectors have disadvantages, since the wave guide sections are very small and therefore glue application is relatively difficult. Hereby especially the danger of contaminating the sensitive optical contact surfaces of the wave guide exists, which can degrade the quality of the connector to a degree that makes it completely unusable.

Furthermore the longitudinal positioning of the wave guide section in the connector has to be performed with high dimensional accuracy, which is difficult to do with gluing, also.

Furthermore glue application requires a complex machine and the curing of the glue takes rather long, making the connectors rather expensive and mass production difficult.

Connectors are also known, where the wave guide section is being clamped. Hereby the clamping tips are typically located directly at the optical contact surface of the wave guide section.

Now, it has become apparent, that this kind of clamping creates bulges within the optical contact surface of the wave guide section, which can be disadvantageous in several respects.

Firstly, there is the risk that the optical contact surface of the wave guide is distorted so severely that their transfer capabilities are in being influenced negatively. Thereby in particular undesirable reflections can be created at the optical contact surfaces.

Furthermore the elevation of the bulges is undefined, which makes an exact longitudinal positioning of the wave guide in the connector at least difficult.

Furthermore with the known clamping tips, especially due to their shape there is the danger of damaging the wave guide. This can make the connector completely unusable in the worst case.

Overall the known solutions need a lot of improvement. On the other hand apparently minor quality or cost improvements can gain a decisive competitive advantage in this competitive market.

SUMMARY OF THE INVENTION

Therefore, it is an object of the invention to provide an optical connector, which is simple, quick and cost-effective to produce.

A further object of the invention is to provide an optical connector, which provides an optical connection of high quality, especially with low damping and low reflection.

A further object of the invention is to provide an optical connector, which is mechanically precise and durable.

Still a further object of the invention is to provide an optical connector, which avoids, or at least mitigates the disadvantages of known connectors.

The object of the invention is already achieved in a surprisingly simple manner by the features of the independent claims. Advantageous embodiments are defined in the dependent claims.

According to the invention an optical connector, especially for plastic light wave guides, more precisely for plastic optical fibers (POF) is provided especially for establishing multimedia connections in vehicles according to MOST®-standard.

Firstly, the connector comprises a preferably dielectric housing, e.g. made from plastic with a receptacle for receiving a complementary mating connector.

The connector furthermore comprises at least a short optical fiber section or a wave guide section, which defines an optical axis of the connector and comprises front and rear optical contact surfaces at its terminating ends. Herein the side is designated as "front", which in a mated configuration points towards the mating connector and vice versa.

Furthermore the connector comprises at least one optical terminal element, e.g. a terminal tube, which is substantially cylindrical, for a mating connection with a mating optical terminal element of the mating connector. Furthermore the terminal tube comprises at least one section, which defines a fiber receiving sleeve. The fiber receiving sleeve holds the optical fiber section in order to establish an optical connection between its front optical contact surface and a complementary optical terminal element including an optical fiber of the mating connector when the connector and the mating connector are joined.

Preferably the connector is at least an optical double connector with two identical optical terminals. Furthermore the optical connector can also comprise additional electrical terminals making it a so called hybrid connector.

Furthermore the optical fiber section is directly, especially without a ferrule, pressed into the fiber channel and permanently affixed in the fiber receiving sleeve or in the fiber channel respectively through clamping by use of a plurality of clamping elements, so that additional gluing is not necessary.

The invention is furthermore distinguished through the fiber receiving sleeve having a front face at, or in the area of the front optical contact surface of the optical fiber section, wherein the clamping elements are longitudinally spaced along the optical axis from the front face of the fiber receiving sleeve.

In particular the front face of the fiber receiving sleeve is located proximally to the front optical contact surface of the optical fiber section, e.g. located in a longitudinal distance between 0 µm and 50 µm, and provided as a front stop surface, which, among others, defines a stop for the complementary terminal element of the mating connector. With others words, a section of the fiber receiving sleeve surrounds the front optical contact area with the section of the fiber receiving sleeve being located immediately adjacent to the stop surface.

Preferably the front of the clamping element(s) is/are positioned behind the front of the fiber receiving sleeve by more than 0 µm and by less than 5 mm, in particular preferably by 100 µm or 200 µm to 3 mm.

Clamping has the an advantage over gluing, since it is cleaner, simpler and faster.

The location of the clamping elements according to the invention may appear disadvantageous at first glance, since the area of the fiber section between the front optical contact surface and the clamping elements is not being clamped. Therefore, this could create a first impression that insufficient guidance or, due to the elasticity of the plastic fiber, insufficient longitudinal positioning would result from the above.

Tests with a connector according to the invention have shown that this is not the case, but that surprisingly rather the opposite is true.

So, typically for mounting the connector the fiber section is pressed directly into the fiber receiving sleeve from behind, whereby a mounting die is inserted into the connector, more precisely into the terminal of the connector from the front and then pressed against the stop surface. The mounting die, or to be more precise its rearwards oriented surface then forms again a stop for the fiber section.

When the fiber section is subsequently pressed in, it is pushed longitudinally with its front optical contact surface from behind, beyond the clamping elements into the fiber receiving sleeve and against the rearwards oriented surface of the mounting die.

Against unbiased expectation the fiber section can even be positioned very precisely in a longitudinal direction during pressing in. Different from the state of the art, the shape of the optical contact surface does not have any, or hardly undefined bulges, but it is precisely defined and therefore provides a more precise stop for the mounting die during pressing-in. The predefined shape of the front optical contact surface of the not yet pressed-in fiber section remains essentially undisturbed through the compression of the fiber section by the clamping elements, e.g. it remains planar or concave. The relatively short and longitudinally not directly mounted section in front of the interlocking elements does not have a significant negative impact.

In the contrary, the well known elasticity of the fiber section can even be used to create a precisely defined backoffset from the stop surface of the fiber receiving sleeve according to MOST®-standard. This standard requires an backoffset of the fiber section of 0 µm to 50 µm from the stop surface. This tolerance can be met very well with the invention.

Hereby the fiber section is first pressed against the mounting die with a predefined force and springs back in a defined manner by a small amount in its front section after removing the force or it springs forward by a small additional amount after removing the mounting die. This springing can be taken into account precisely into the design of the mounting die and into the selection of the pressing force.

The connector according to the invention has a further additional advantage, since the clamping elements are set back also relative to the front optical contact surface of the fiber section.

Due to the minor compression of the front optical contact surface also damping and reflection at the front optical contact surface can be reduced compared to connectors with tips located immediately at the front optical contact surface.

Overall the connector is assembled from relatively few parts and the production is simplified.

According to a preferred embodiment of the invention the fiber receiving sleeve defines a substantially cylindrical fiber channel, wherein the optical fiber section is affixed and the interlocking elements protrude radially from the interior circumference of the fiber receiving sleeve or guiding sleeve into the inside of the fiber channel.

It is very simple to integrally form the clamping elements, the fiber receiving sleeve, the terminal and/or the connector housing in one piece, so that the short fiber section is directly pressed into the connector housing.

The clamping elements preferably clamp into the exterior circumference of the optical fiber section, more precisely into the case of the fiber section, especially material-displacing when compressing. In an advantageous manner the fiber core is hereby not disturbed.

According to one preferred embodiment of the invention the fiber receiving sleeve has a front and a rear section or a guide section or an insertion section respectively, which are longitudinally spaced from each other and which are adjacent to each other, wherein the interior diameters of the two sections are different in size. Especially the interior diameter of the rear section is larger than the interior diameter of the front section.

On the one hand this has the advantage that the fiber section is precisely guided in its front section or in the area of its front optical contact surface, so that a high coaxiality between the fibers and the fiber sections to be connected can be achieved. On the other hand the fiber section can be easily inserted over a wide range namely until the tighter guide section is reached.

Preferably between the front and the rear section there can be a chamfer or an intermediate section converging towards the front. This facilitates the insertion of the fiber section even further.

According to the invention it has become apparent, that the front section or guide section has an interior diameter, which should be selected between 40 µm smaller and 120 µm larger, in particular preferably between 20 µm smaller and 60 µm larger than the exterior diameter of the optical fiber section. The interior diameter of the rear insertion section is preferably sized in a way that a radial clearance of 40 µm to 100 µm, in particular 20 µm to 50 µm is achieved there.

These sizes have provided a good balance between guidance precision and ease of insertion.

In particular the clamping elements are located in the rear insertion section of the fiber receiving sleeve, longitudinally reaching from the rear end of the front guide section into the rear insertion section. Since the clamping elements do not reach into the guide section in this embodiment, a particularly precise alignment could be accomplished. In this respect using at least three to four clamping elements, which are equally spaced over the circumference, has proven to be advantageous.

According to an especially preferred embodiment of the invention these clamping elements are formed as engaging lugs or engaging hooks. These engaging lugs or engaging hooks have a substantially triangular cross section in radial direction, in particular in the associated radial plane. In insertion direction of the fiber section the engaging lugs or engaging hooks have an inwardly inclined and in particular a flat ramp surface, in order to press in the fiber section from the back side of the connector housing, and/or a frontal engaging surface, which protrudes radially, or substantially perpendicular to the optical axis of the fiber section in order to clamp the fiber section—by the compression action—in front of the engaging surface, when the fiber section is inserted beyond the engaging surface. In particular the engaging surface of the engaging lugs is set back longitudinally relative to the front side of the fiber receiving sleeve.

In other words the engaging lugs have a ramp-like or a saw-teeth-like form and their frontal engaging surface is preferably flush with the rear end of the frontal guide section of the fiber receiving sleeve. This design has proven to be easy to manufacture.

The engaging lugs have preferably a width along the inner circumference of the fiber receiving tube of 50 μm to 1 mm, preferably 150 μm to 400 μm and a height radially protruding into the fiber channel of 20 μm to 500 μm, preferably 50 μm to 200 μm.

It has become evident that a safe, permanent clamping of the fiber section can hereby be achieved by simultaneously moderate compression.

The connector is preferably provided as a so-called compact connector, i.e. that the electro-optical converter(s) is/are directly attached to the connector or to the connector housing. Therefore the connector comprises preferably at least one electro-optical converter or transceiver (FOT) with an optical input/output, wherein the converter is located at a rear end of the fiber channel in such a manner so that through the rear optical contact surface of the fiber section an optical connection between the fiber section and the converter is established. Hereby the converter can now be optically contacted through the front optical contact surface.

The optical converter is for example connected directly to the rear side of the connector housing by use of a bracket. The bracket is preferably stamped from metal and formed, more precisely essentially U-shaped and latched into the side surfaces of the connector housing. Furthermore, the bracket can also be connected to a printed circuit board by means of soldering pins.

Furthermore the bracket has preferably at least one elastic spring section pressing, if mounted, the converter forward into the direction of the rear optical contact surface of the fiber section, but especially without touching it.

Preferably, the bracket has further a rear wall and an upper cover section, integrally connected in one piece along the rear upper edge. In particular the upper cover section abuts to the connector housing from the top, providing stable support. The spring-elastic section is furthermore attached to the upper cover section and the spring elastic section has a substantially L-shaped cross section. It should be noted in this context that this connection of the converter can also be used with other connectors.

Hereinafter the invention is described in more detail by means of embodiments and with reference to drawings, wherein same and similar elements are partially denoted with the same reference signs.

BRIEF DESCRIPTION OF THE FIGURES

It is shown in:

FIG. 6 a sectional view of the connector shown in FIG. 1 taken along the line C-C with fiber sections pressed in;

DETAILED DESCRIPTION OF THE INVENTION

Figure 1:
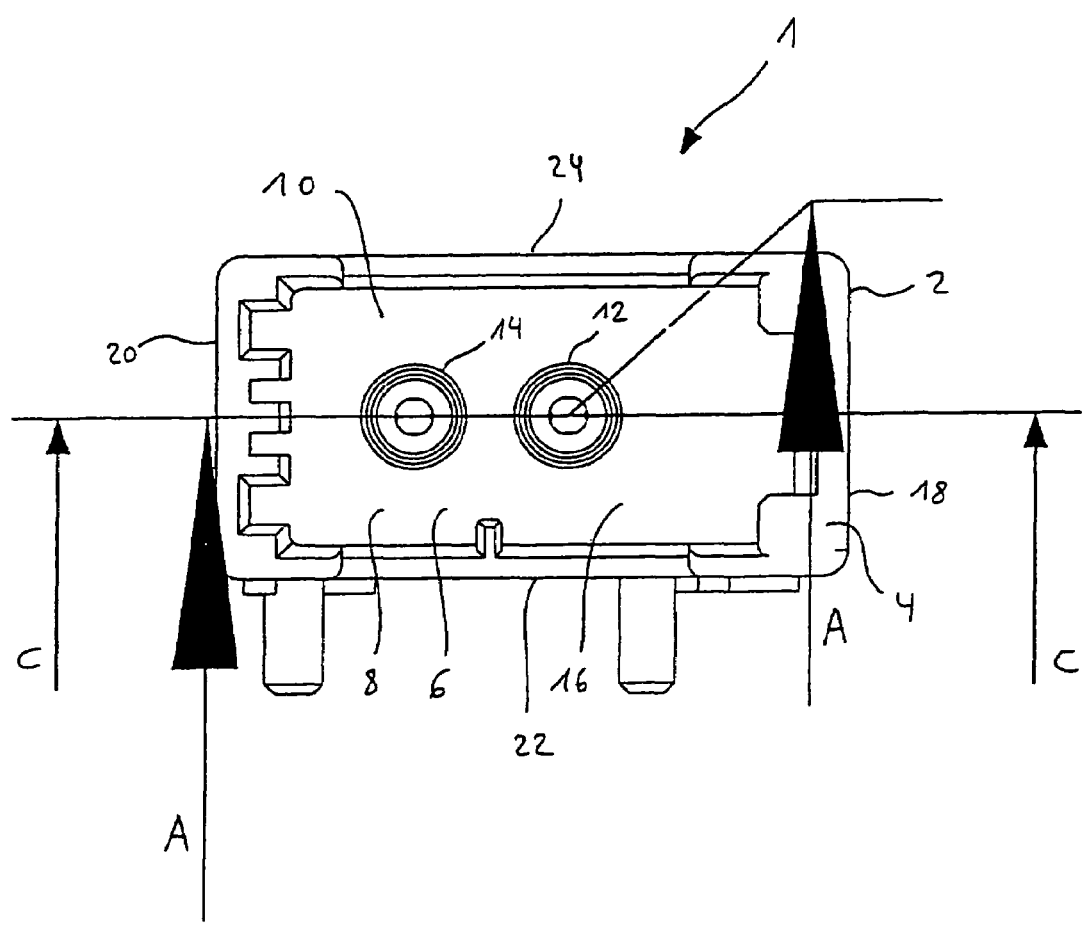
FIG. 1 a front view of the connector according to the invention.

FIG. 1 shows a connector (1) with a plastic connector housing (2), having an opening (6) on its front (4). The opening (6) provides access to a cavity (8) in the connector housing (2), hereby creating a receptacle (10) for a mating connection with a mating connector (not shown) having a complementary optical terminal element including an optical fiber defining an optical axis.

In the cavity (8) two optical terminal elements (12, 14) are located, which have the form of cylindrical terminal sleeves, which are integrally formed in one piece with the connector housing (2).

The connector housing (2) is integrally formed in one piece by a front side (4), a rear side (16), two side pieces (18, 20), a bottom (22) and a cover (24).

Figure 2:
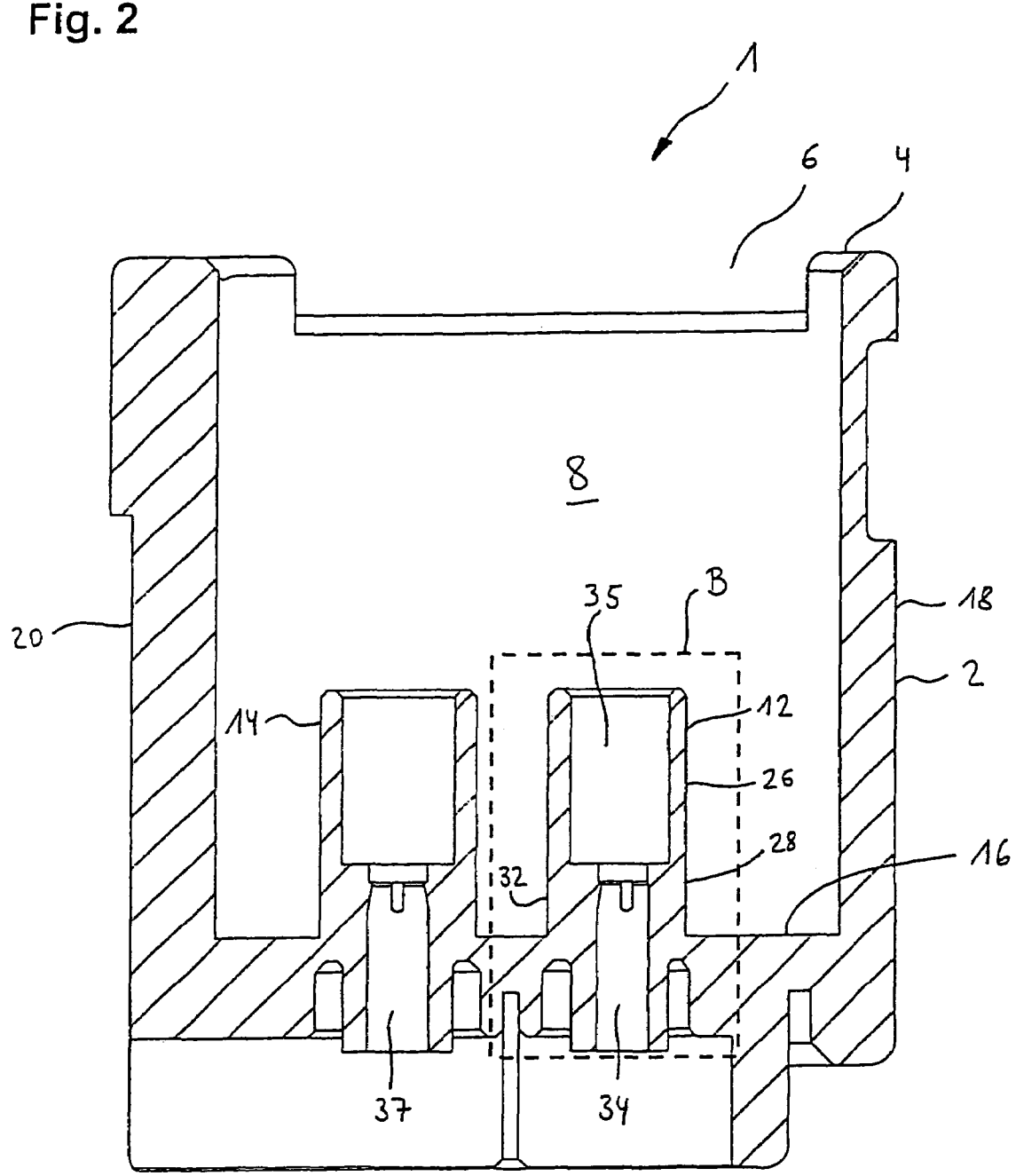
FIG. 2 a sectional view of the connector shown in FIG. 1 taken along the line A-A.

With reference to FIG. 2, it is shown in a cross section through the connector housing (2), that the cavity (8) reaches from the front side (4) to the rear side (16) of the connector housing (2). From the rear side (16) the two terminal sleeves (12, 14) protrude into the cavity (8).

For connecting a section of the mating connector is inserted through the opening into the cavity (8).

Since the two terminal sleeves (12, 14) are substantially identically formed, subsequently, in lieu of the two terminal sleeves, only the terminal sleeve (12) shown on the right side of FIG. 2 is being referred to.

The terminal sleeve (12) has a hollow cylindrical front connection section (26) and a fiber receiving sleeve or guide sleeve (32), wherein the connection section (26), together with the guide sleeve (32) and with the connector housing (2) are integrally formed in one piece. Furthermore the guide sleeve (32) has a frontal, substantially hollow cylindrical area (28) protruding into the cavity (8). In its center the guide sleeve (32) defines a coaxial, substantially hollow cylindrical cavity, which defines a fiber channel (34).

With reference to FIG. (3), wherein the terminal sleeve (12) is shown in detail, it can be seen, that the terminal section (26) has a cylindrical cavity or channel (35) for receiving a mating terminal element (not shown), which can be inserted into the cavity (35). The cavity (35) extends from a front side (36) of the terminal sleeve (12) to a rear stop surface (38), which serves as a stop for the mating connector.

The guide sleeve (32), which at the rear is immediately adjacent to the terminal section (26) or the cavity (35) respectively and thereby directly abuts the rearward stop surface (38), comprises a guide section (42), an insertion section (44) and a chamfer in between, or a converging section (46).

Furthermore the guide sleeve (32) is open on its rear side (48), so that from behind, in the insertion direction R, a short wave guide section or fiber section can be inserted.

Figure 3:
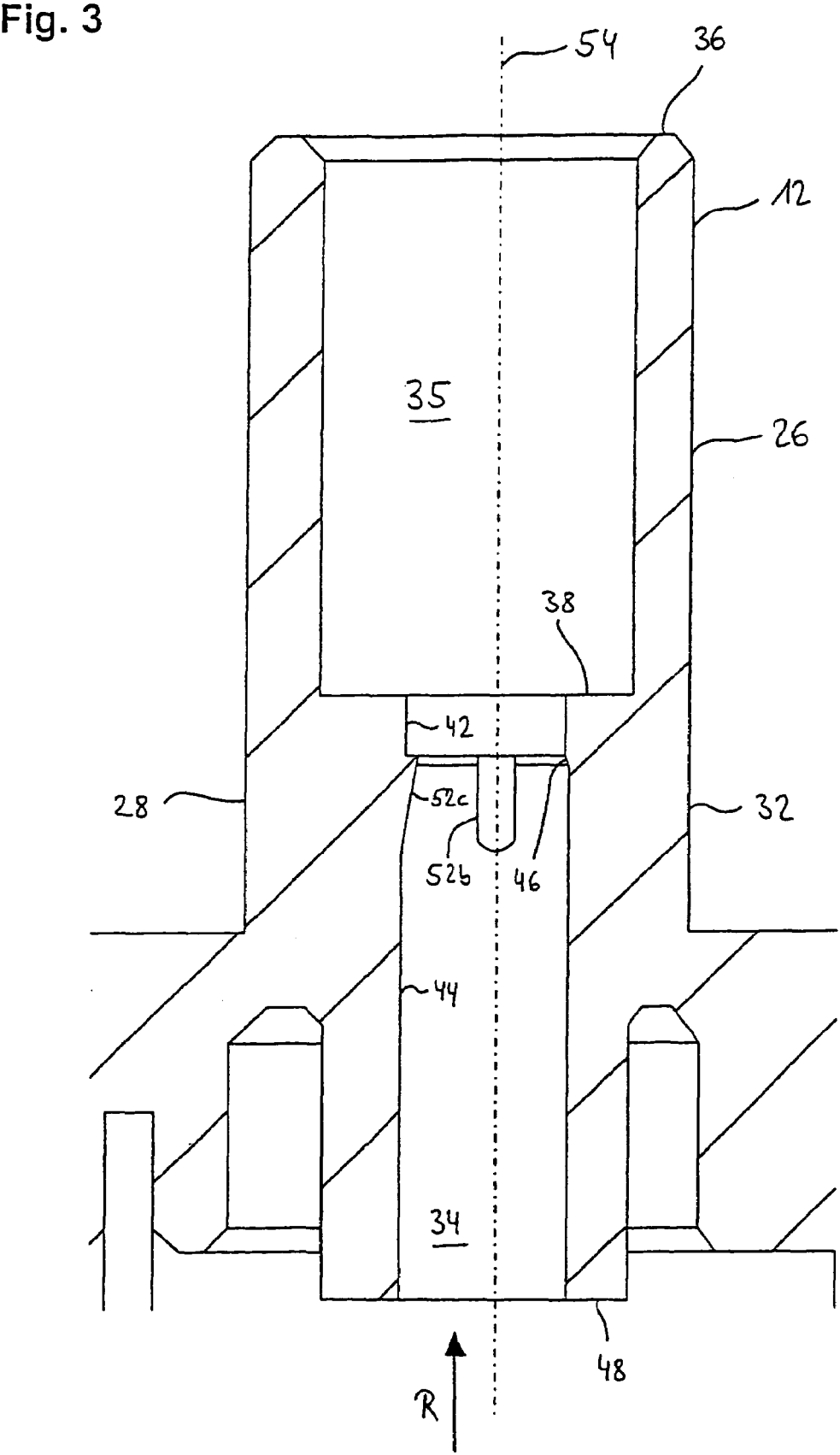
FIG. 3 an enlarged view of portion B in FIG. 2.

Furthermore in FIG. 3 a first clamping element, embodied as a an engaging lug (52b) is shown in a top view and a second engaging lug (52c) is shown in a radial cross section with reference to the optical axis (54). The two other engaging lugs (52a, 52d) of the four engaging lugs (52a-52d) located in rotational symmetry can not be seen in FIG. 3.

Figure 4:
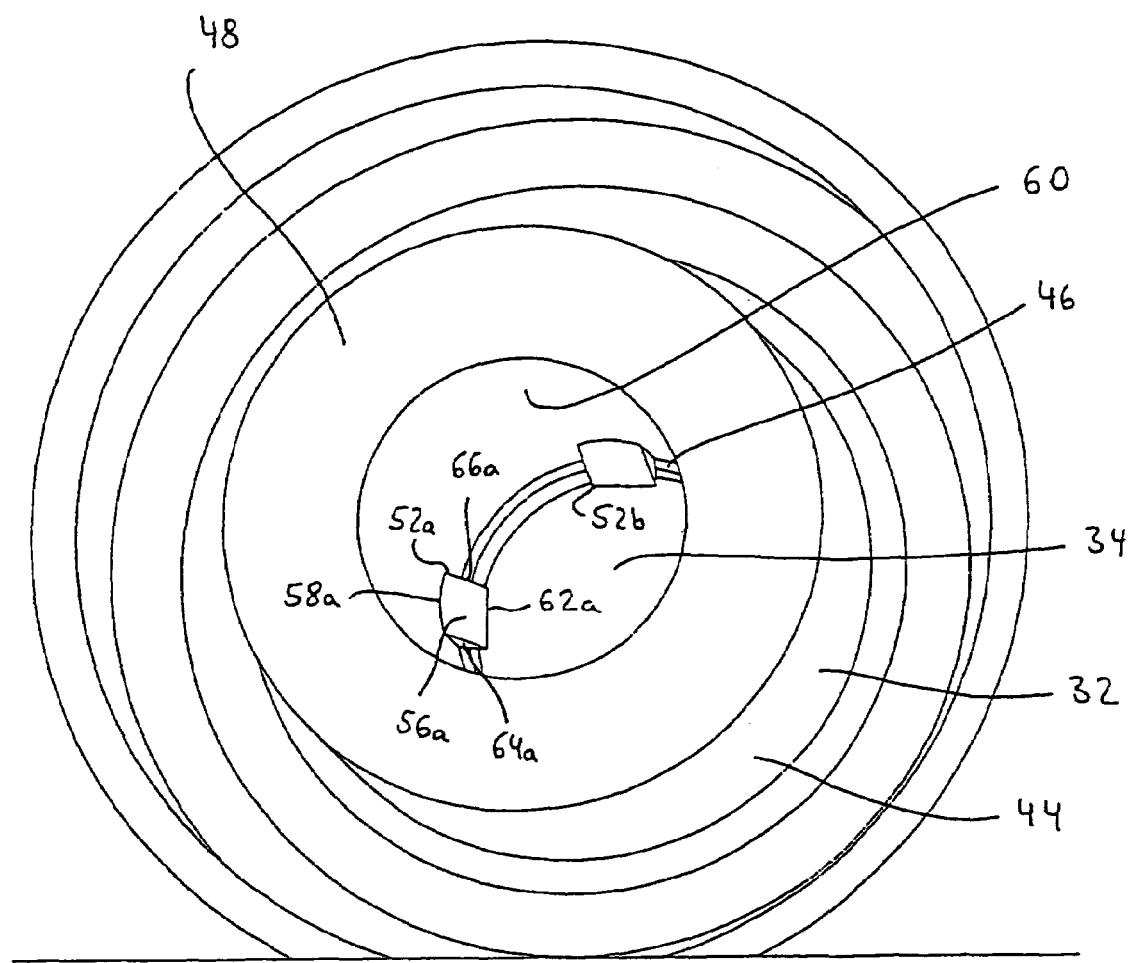
FIG. 4 a perspective diagonal rear view of one of the two fiber receiving sleeves of the connector.

With reference to FIG. 4 a perspective rear view into the fiber channel extension (34) from the rear side (48) of the guidance sleeve (32) is shown. In this figure the ramp shape of the engaging lugs (52a) and (52b) can be seen best.

The engaging lugs (52a-52d) protrude into the inside of the fiber channel extension (34) close to the end (39) opposing the insertion end (48) of the guide sleeve (32).

Figure 5:
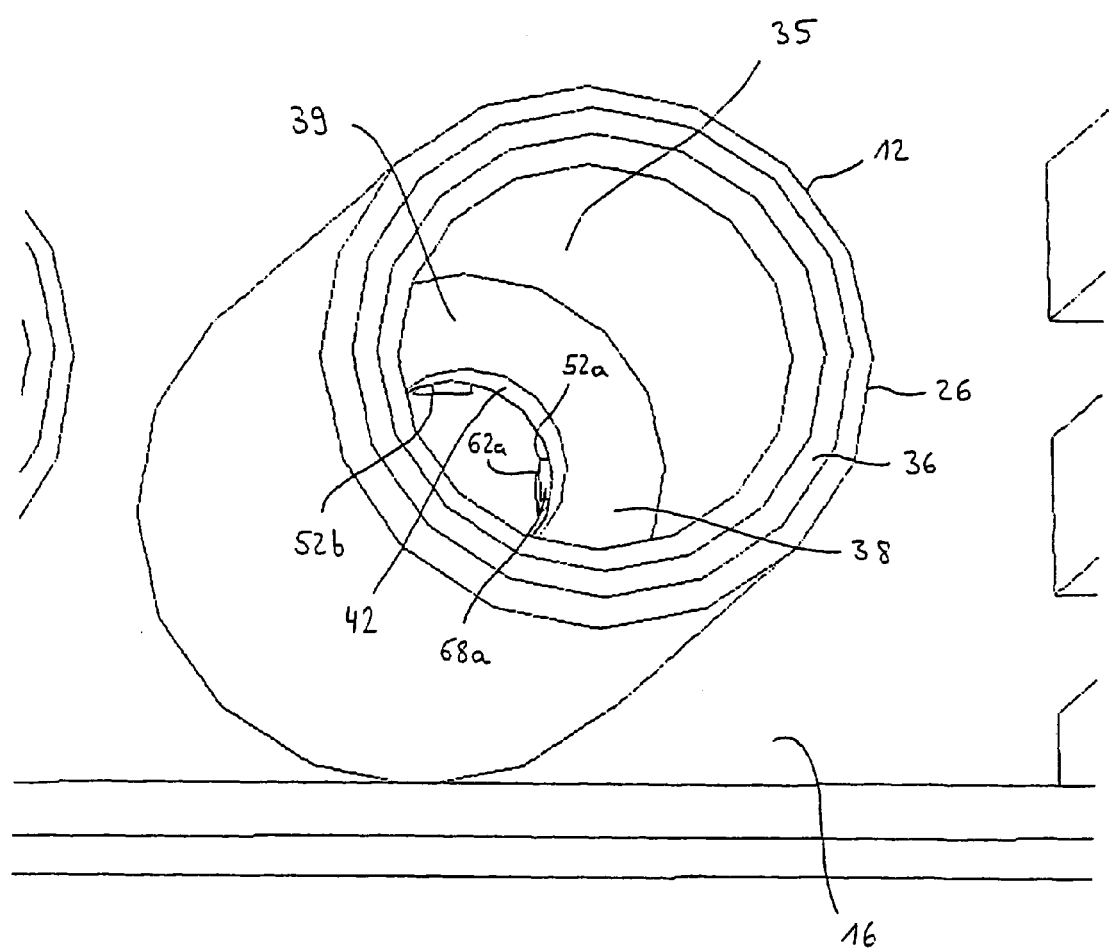
FIG. 5 a perspective diagonal front view of a terminal of the connector.

In representation of all engaging lugs (52a-52d), the engaging lug (52a) has a planar slide surface (56a), inclined inwardly in insertion direction R, (FIG. 3). The slide surface 56a extends between a curved edge line (58a) with the interior circumference (60) of the guide sleeve (32) and a straight edge (62a) with a front surface 68a (FIG. 5). The engaging lug (52a) is furthermore limited by two triangular side surfaces (64a, 66a).

With reference to FIG. (5), the terminal section (26) with its front side (36) and the rear stop (38) can be seen. Furthermore the front surface (68a) of the engaging lug (52a) can be seen, protruding vertically from the interior circumference (60) of the insertion section (44) to the straight edge (62a).

Figure 6:
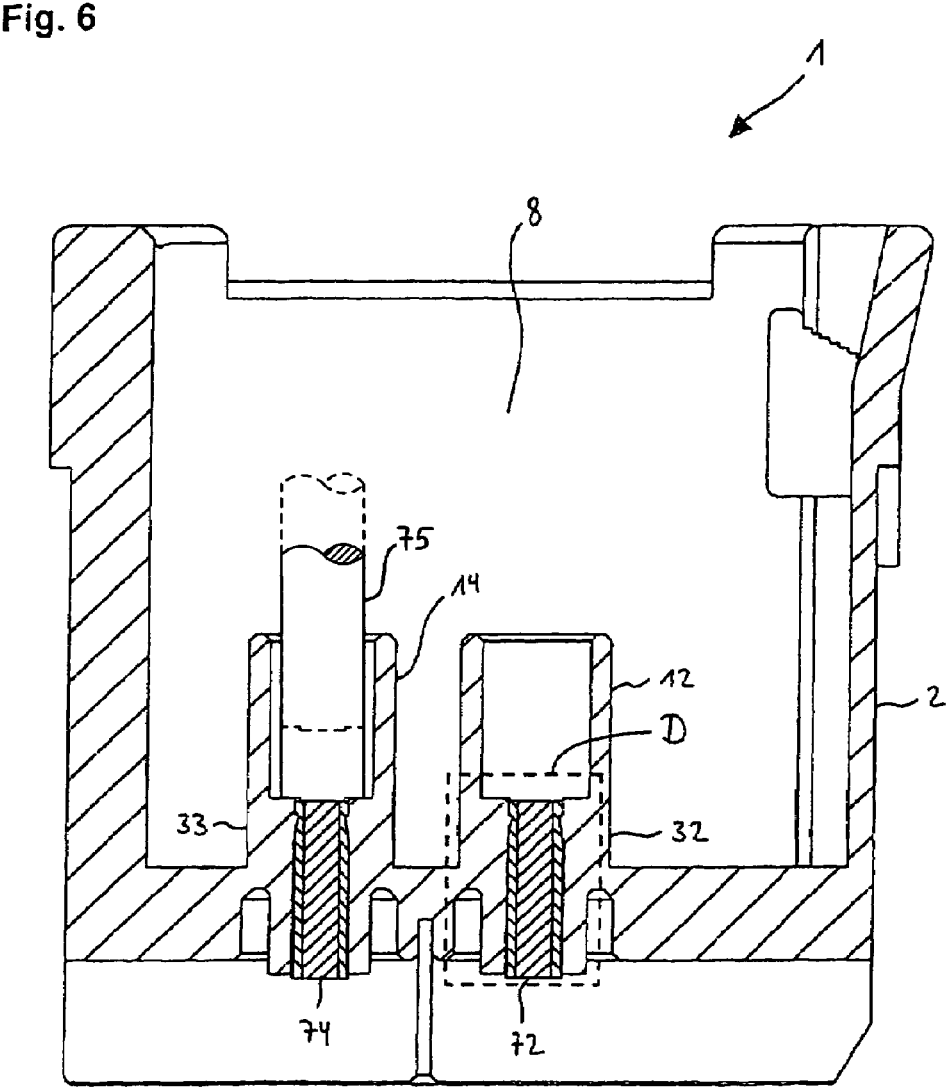

With reference to FIG. 6 the connector (1) is shown comprising a pair of terminal sleeves 12, 14 and a pair of fiber sections 72, 74 directly pressed thereinto from the rear side of the connector, where the electro-optical converters will be accommodated. During the pressing step, a mounting die 75 is used as a stop for the respective fiber sections, as shown for the fiber section 74 in sleeve 14 as the left hand side of FIG. 6.

Figure 7:
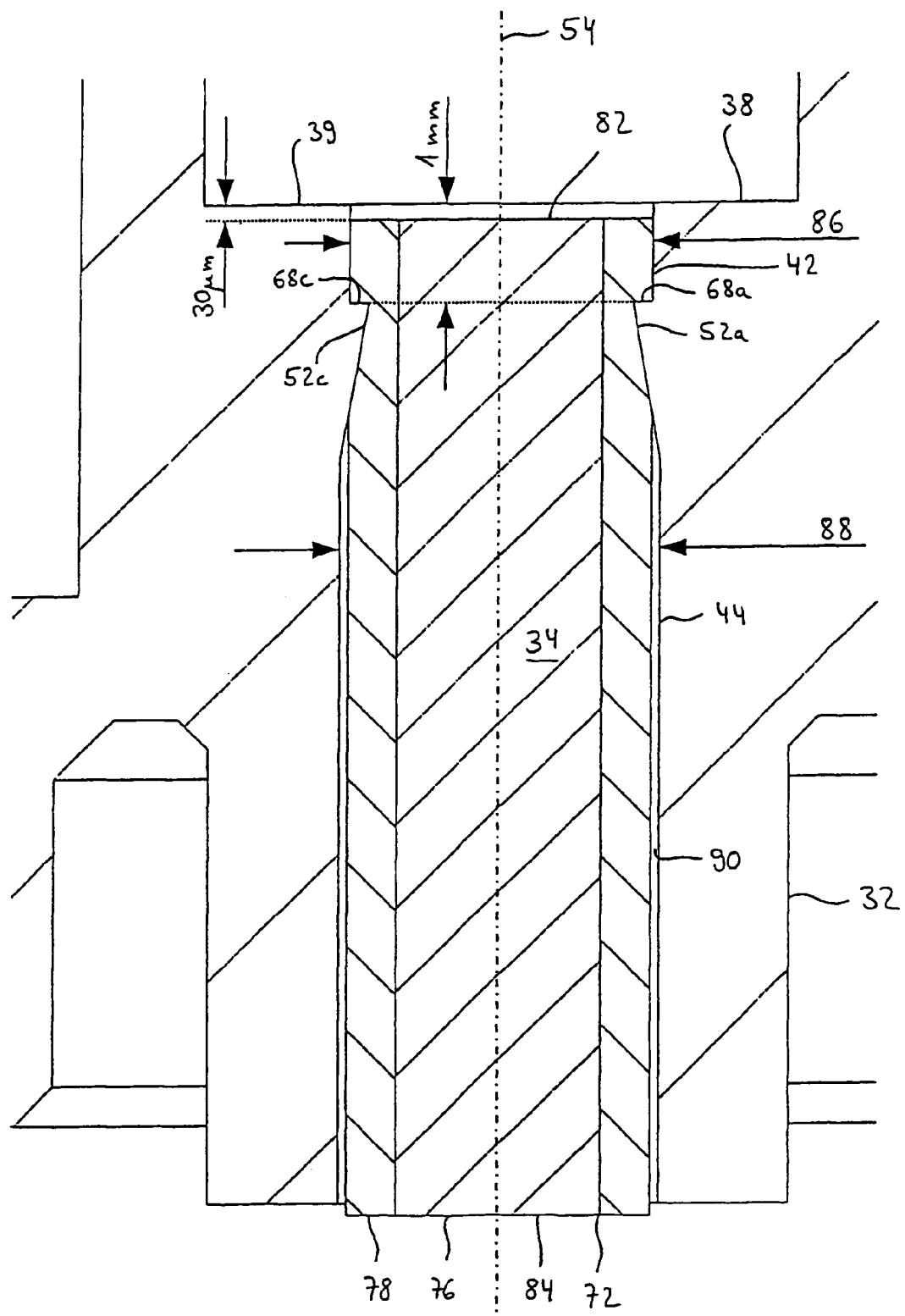
FIG. 7 an enlarged view of portion D from FIG. 6.

With reference to FIG. 7 the insertion of the fiber section (72) into the guide sleeve (32) is described hereinafter for both connection elements (12, 14).

The fiber section (72) consists of a light conducting plastic core (76) and of an enclosing envelope (78). The fiber section (72) furthermore has a front and a rear optical contact surface (82, 84).

The fiber section (72) is almost completely inserted into the fiber channel extension (34) and affixed in the fiber channel extension (34) by means of the engaging lugs (52a-52d). Hereby the engaging lugs (52a-52d) mainly reach only into the envelope (78) in a compressing manner, wherein the front surfaces (68a-68d) secure the fiber section (72) in particular against rearward dislocation. Therefore, by means of the engaging lugs (52a-52d) the fiber section (72) is affixed to the fiber channel extension (34) in a durable and safe manner.

Furthermore in FIG. 7 it can be seen that the front optical contact surface (82) is located in backward direction relative to the rear stop (38) in order to comply with the MOST-specification. The backoffset is 30 μm in this example.

Furthermore the engaging lugs or hooks (52a-52d) are offset relative to the stop surface (38), which coincides with the front side (39) of the fiber receiving sleeve (32) and they are offset relative to the optical contact surface (82). The offset from the front area (39) of the fiber receiving sleeve (32) is 1 mm.

Furthermore the interior diameter (86) of the guide section (42) is identical with the exterior diameter of the fiber section (72), whereby exact alignment is accomplished. To the contrary the interior diameter (88) of the insertion section (44) is slightly larger than the exterior diameter of the fiber section (72), so that a clearance (90) of approximately 60 μm is provided in the rear area of the fiber section (72).

Figure 8:
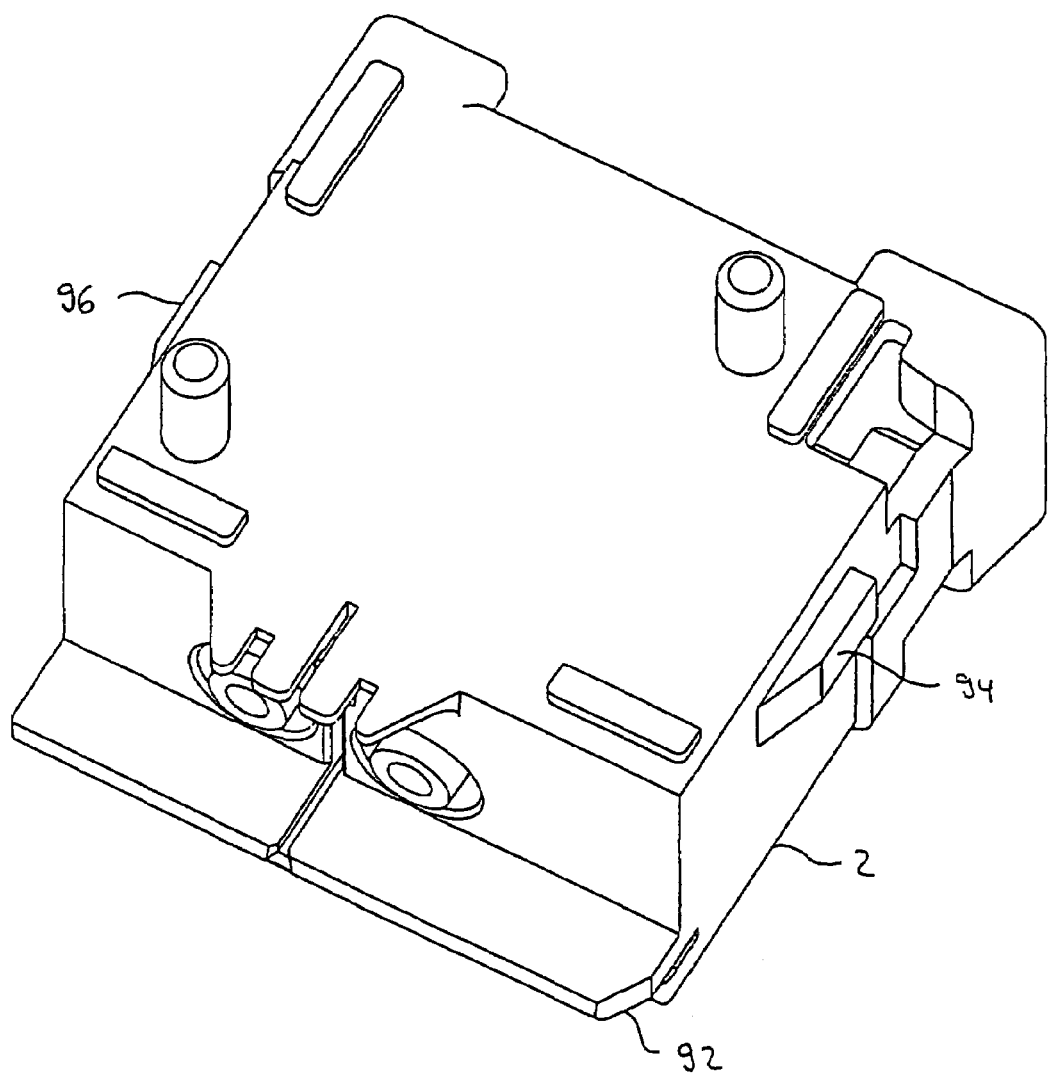
FIG. 8 a perspective back view of the connector taken diagonally from below.

With reference to FIG. 8 the connector housing 2 is shown diagonally from the rear and below with a rearward cover and support section (92) and with 2 lateral latching projecting parts (94, 96).

Figure 9:
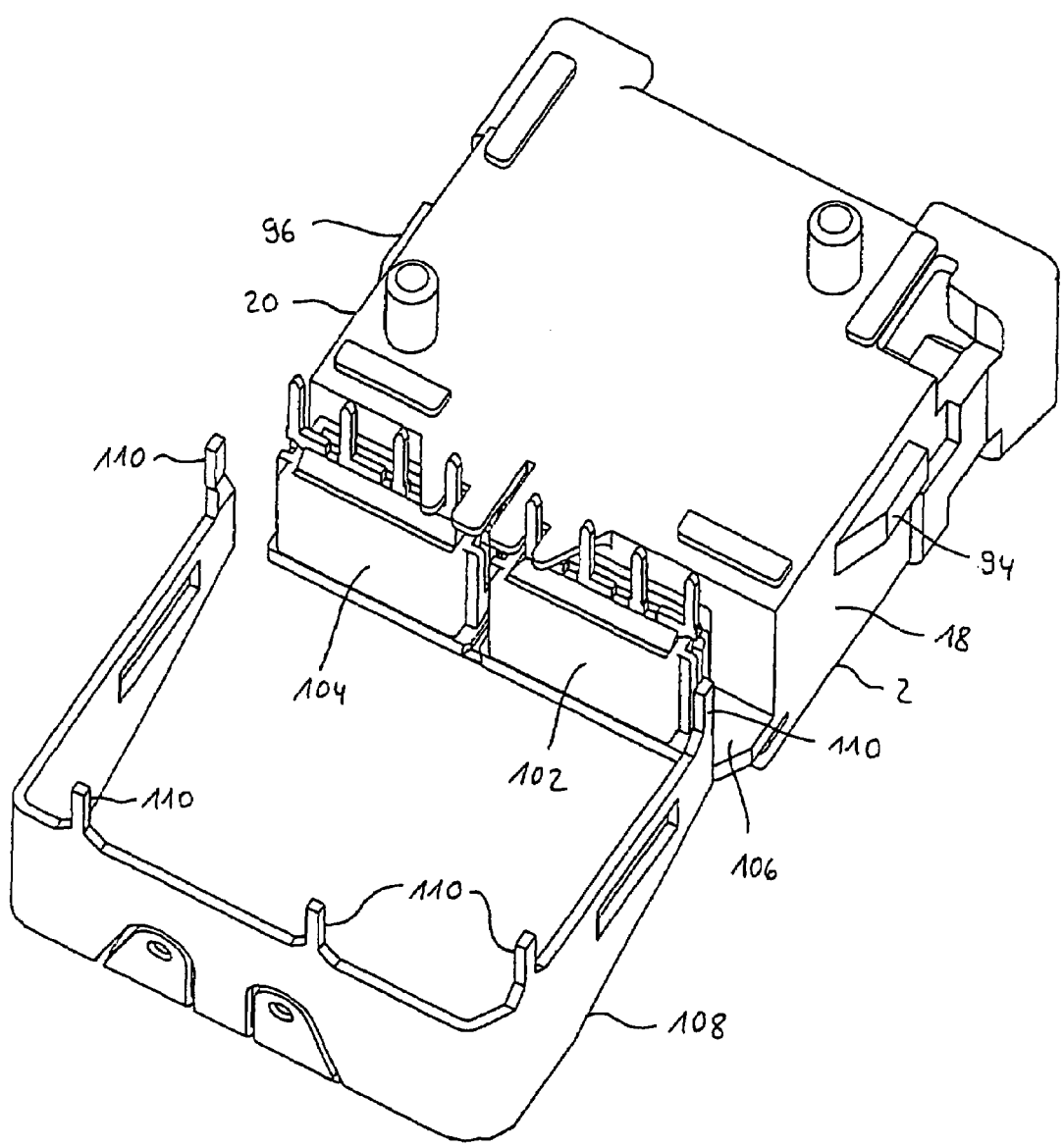
FIG. 9 a perspective view analogous to FIG. 8 with electro-optical converters and mounting bracket.

FIG. 9 shows the connector housing (2) with two electro-optical converters (102, 104) mounted in the rear, which are attached to the associated guide sleeve (32, 33) in order to establish an optical connection with the associated fiber sections. The electro-optical converters (102, 104) abut with their upper side to the bottom (106) of the support wall (92).

A substantially U-shaped tension bracket (108) is then pushed onto the connector housing (2) from the rear in order to fixate the converters (102, 104). The tension bracket (108) comprises a plurality of integral soldering pins (110).

Figure 10:
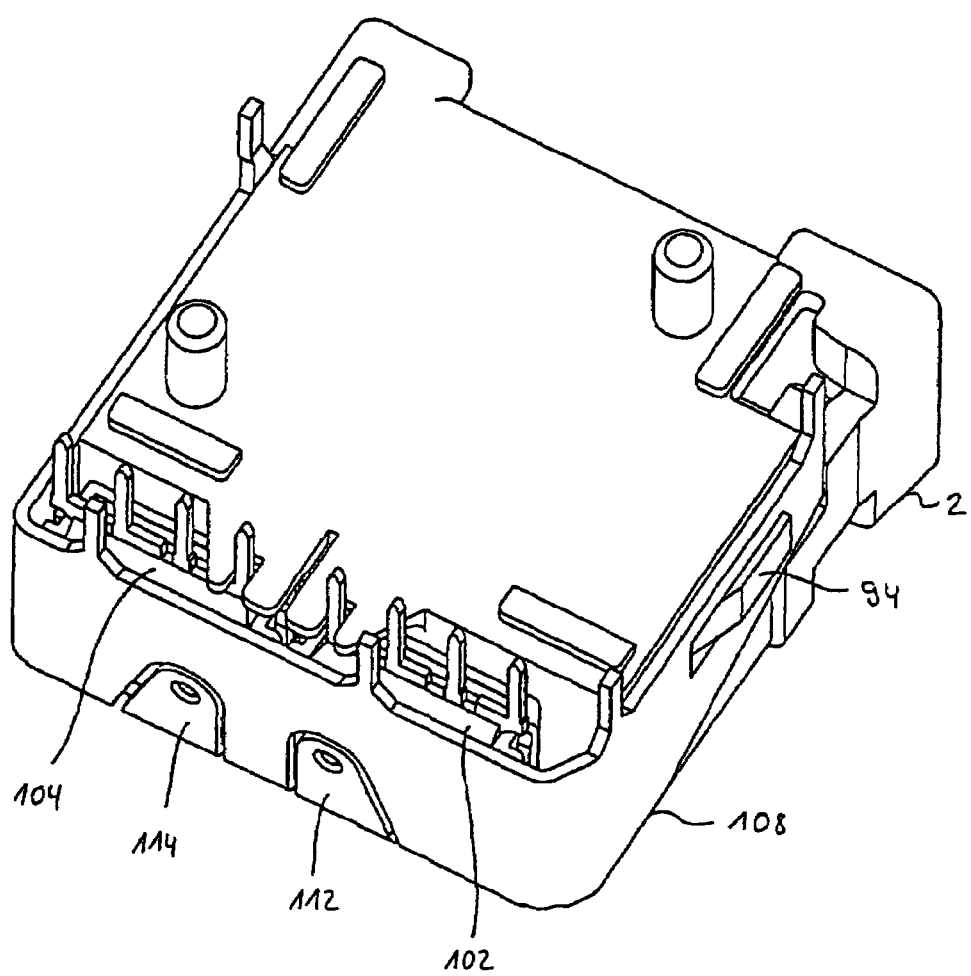
FIG. 10 analogous view like FIG. 9 with latched mounting bracket.

With reference to FIG. 10 the bracket (108) is shown in a mounted position.

In this mounted condition the converters (102, 104) are pressed forward by means of elastic spring arms (112, 114) mounted on the upper side of the bracket (108) and thereby preloaded.

Figure 11:
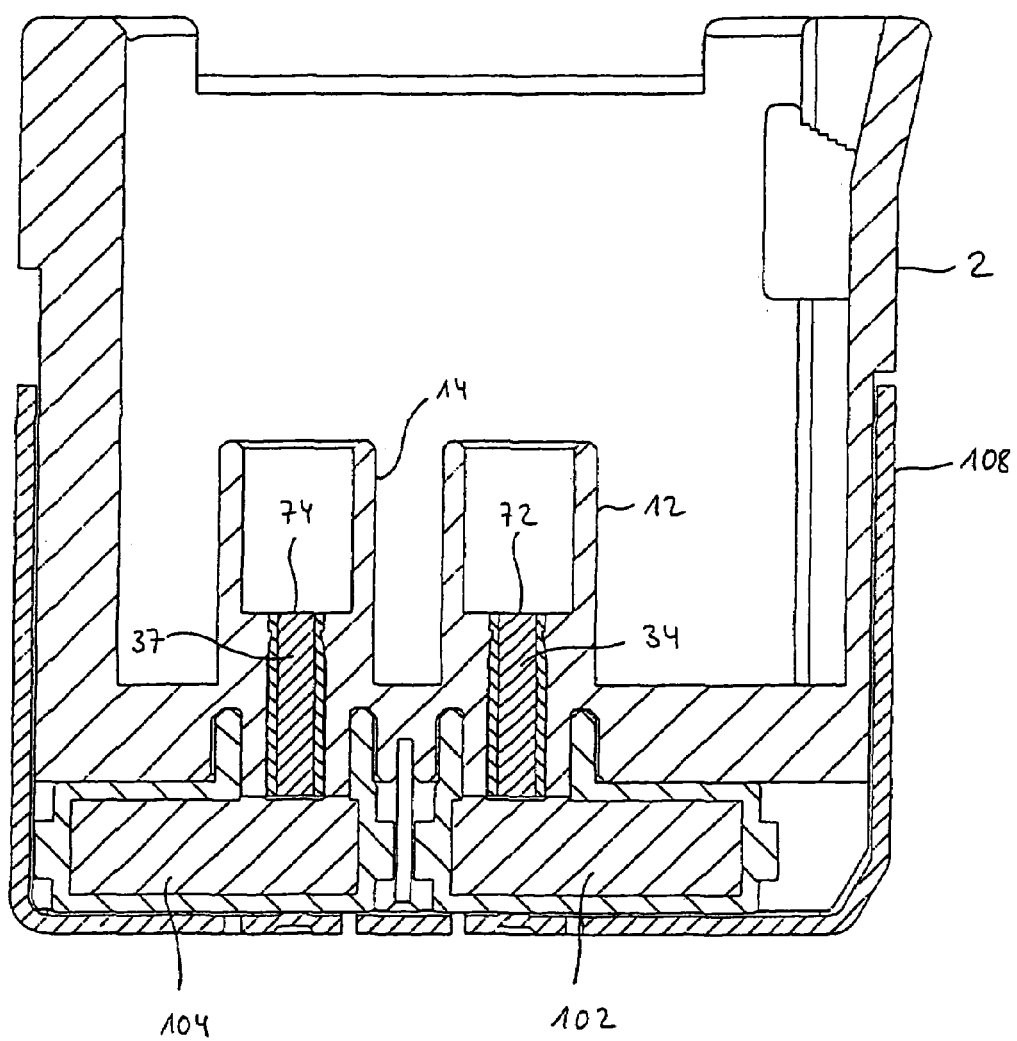
FIG. 11 a sectional view analogous to FIG. 6 with electro-optical converters and latched mounting bracket.

FIG. 11 explains the optical connection between the fiber sections (72, 74) pressed into the fiber channels extensions (34, 37) and the associated converters (102, 104).

It is apparent to a person skilled in the art that the above described embodiments are exemplary in nature and that the invention is not limited to these embodiments, but that it can be varied in many ways without exceeding the scope of the invention.

What is claimed is:

1. An optical connector for establishing a connection to a complementary mating connector having a complementary optical terminal element defining a complementary optical axis, comprising:

a connector housing including a mating receptacle for establishing a connection with said complementary mating connector;

said mating receptacle including at least one integrally-formed sleeve, protruding from a side of said connector housing, forming a channel and a channel extension adjacent to one another along a stop surface for said complementary optical terminal element;

said channel and channel extension forming a channel axis to be coincident with said complementary optical axis of said complementary optical terminal element, when the same is mated with the optical connector;

said channel extension being formed with clamping elements, and at least one optical fiber section;

said at least one optical fiber section having a front end with a front optical contact surface and a rear end with a rear optical contact surface, said optical fiber section being affixed in said channel extension of said sleeve by means of said clamping elements, and being positioned to establish, with said front optical contact surface, an optical connection to said complementary optical element of said complementary connector;

wherein said clamping elements define a gradually narrowing opening in said channel extension, longitudinally spaced from said stop surface and arranged with a set-back relative to said front optical contact surface such that said front end of said at least one optical fiber section extends beyond said gradually narrowing opening in said channel extension adjacent to said complementary optical terminal element of said complementary connector.

2. The connector according to claim 1, wherein said stop surface forms a stop for said complementary optical terminal element of said complementary connector leaving a gap to said front optical contact surface of said optical fiber section.

3. The connector according to claim 1, wherein said channel extension is a substantially cylindrical fiber channel having said clamping elements protruding radially inwardly into said channel at said narrowing opening.

4. The connector according to claim 1, wherein said clamping elements are integrally formed with walls of said sleeve.

5. The connector according to claim 1, wherein said clamping elements are formed to engage said optical fiber section in displacing and compressing some material of said optical fiber section.

6. The connector according to claim 1, wherein said clamping elements each comprise a front face adjacent to said stop surface, each said front face of said clamping elements being longitudinally spaced from said stop surface towards said rear end of the optical fiber section.

7. The connector according to claim 6, wherein each said front face of said clamping elements is offset relative to said stop surface by more than 30 µm and less than 5 mm.

8. The connector according to claim 1, wherein said channel extension includes a front guide section having a first interior diameter and a rear insertion section having a second interior diameter, said second interior diameter being larger than said first interior diameter.

9. The connector according to claim 8, wherein a chamfer is provided between said front guide section and said rear insertion section.

10. The connector according to claim 1, wherein said sleeve, in the region of said channel extension, includes a rear insertion section and a front guide section having an interior diameter for guiding said fiber section front end that has an exterior diameter, said interior diameter of the front guide section being between 40 µm smaller and 120 µm larger than said exterior diameter of said optical fiber section.

11. The connector according to claim 8, wherein said optical fiber section has a radial clearance of 40 µm to 100 µm in said rear insertion section of said fiber receiving sleeve.

12. The connector according to claim 8, wherein said clamping elements are located in said insertion section.

13. The connector according to claim 8, wherein said clamping elements are longitudinally spaced from said rear end of said front guide section in direction of said insertion section.

14. The connector according to claim 1, wherein at least three clamping elements are arranged in said channel extension, evenly spaced around the circumference of said channel extension.

15. The connector according to claim 14, wherein said clamping elements are formed as engaging lugs.

16. The connector according to claim 15, wherein said engaging lugs have a substantially triangular cross section, seen in radial direction onto said optical fiber section.

17. The connector according to claim 15, wherein said engaging lugs each has a ramp surface inclined to said rear end of said fiber section and a front face that extends substantially perpendicularly to said channel axis.

18. The connector according to claim 17, wherein said engaging lugs each has a width in the range of 150 µm to 400 µm measured in circumference direction of said channel extension and a height of 50 µm to 200 µm measured in radial direction of said channel extension, each lug protruding radially inwardly of the channel extension.

19. The connector according to claim 1, further comprising at least one electro-optical converter including an optical input/output, said converter being located at said rear end of said optical fiber section and said rear optical contact surface of said fiber section providing an optical connection between said fiber section and said converter.

20. The connector according to claim 19, wherein said connector housing has a rear side and side surfaces, and said electro-optical converter is mounted by a bracket directly to said rear said of said connector housing.

21. The connector according to claim 20, wherein said bracket is stamped from sheet metal, substantially U-shaped and interlocked on said side surfaces of said connector housing, the bracket also being provided with soldering pins for connecting with a printed circuit board.

22. The connector according to claim 20, wherein said bracket comprises at least one elastic spring section, pressing said converter onto said rear optical contact surface of said fiber section when assembled.

23. The connector according to claim 22, wherein said bracket compromises a rear wall and an upper cover, integrally connected along a rear upper edge in one piece, said spring elastic section being attached to said upper cover and said spring elastic section having a substantially L-shaped cross section.

24. A method for manufacturing an optical connector for establishing a connection to a complementary mating connector that has a complementary optical terminal element, comprising the steps of:
  a) providing a connector housing with a mating receptacle for mating connection with a said complementary connector, wherein said receptacle has at least two sleeves forming each a channel and a channel extension, for mating connection with said complementary optical terminal elements of said complementary connector, and wherein each of said channel extensions has a front side and a rear side and includes a plurality of inner clamping elements that define a narrowing opening in said channel extension, said narrowing opening being longitudinally spaced from said front side of said channel extension;
  b) providing at least two optical fiber sections, each having a front end with a front optical contacting surface and a rear end with a rear optical contact surface;
  c) pressing said fiber sections directly into an associated one of said channel extensions thus fixing said fiber sections by means of said clamping elements in said channel extensions, such that said front end of said optical fiber section extends beyond said narrowing opening in said channel extension adjacent to said complementary optical terminal element of said complementary connector;
  d) positioning at least two electro-optical converters in said connector housing with each a converter at said rear side of each associated channel extension, whereby an optical connection between said fiber sections and said converters is established through rear optical contacting surfaces of said fiber sections; and
  e) affixing said converters to said connector housing.

25. The method according to claim 24, wherein each said comprises a stop surface in the area between said channel and said channel extension, also comprising the step of:
  pressing a mounting die against an associated one of said stop surfaces in each said sleeve, thus forming a front stop for the associated fiber section during step c).

* * * * *